No. 793,680. PATENTED JULY 4, 1905.
G. H. REYNOLDS.
SPOOL.
APPLICATION FILED FEB. 1, 1904.

2 SHEETS—SHEET 1.

Witnesses
R. H. Newman
Rob't S. Allyn

Inventor
Geo. H. Reynolds
by R. S. Mitchell
Attorney

No. 793,680. PATENTED JULY 4, 1905.
G. H. REYNOLDS.
SPOOL.
APPLICATION FILED FEB. 1, 1904.

2 SHEETS—SHEET 2.

Witnesses
R. H. Newman.
Rob S. Allyn.

Inventor
Geo. H. Reynolds
by R. Stutchbury
Attorney

No. 793,680.

Patented July 4, 1905.

UNITED STATES PATENT OFFICE.

GEORGE H. REYNOLDS, OF MANSFIELD, CONNECTICUT.

SPOOL.

SPECIFICATION forming part of Letters Patent No. 793,680, dated July 4, 1905.

Application filed February 1, 1904. Serial No. 191,523.

*To all whom it may concern:*

Be it known that I, GEORGE H. REYNOLDS, a citizen of the United States, residing at Mansfield, Tolland county, Connecticut, have invented a certain new and Improved Spool, of which the following is a full, clear, and exact description.

My invention relates to spools, the object being to provide a strong and durable hollow spool.

Figure 1:
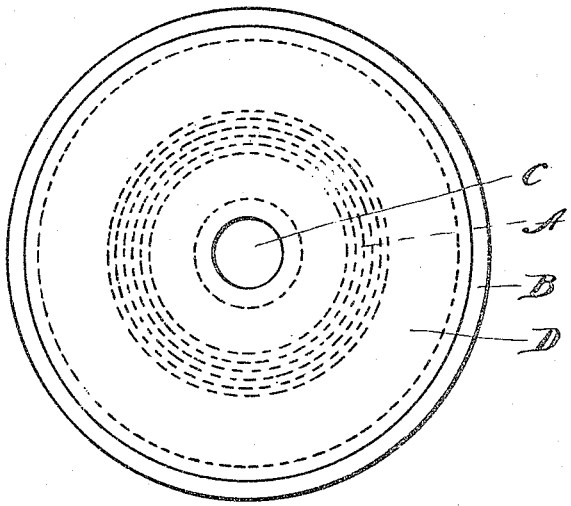
Figure 2:
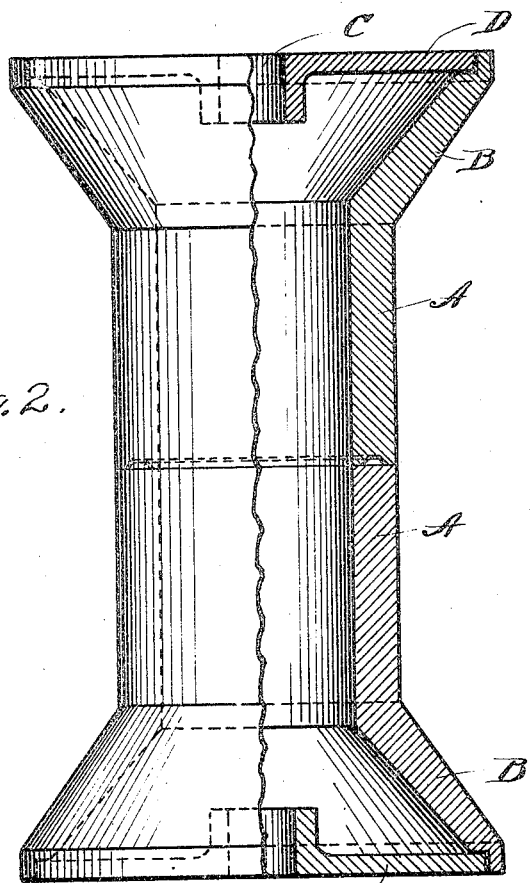
Figure 3:
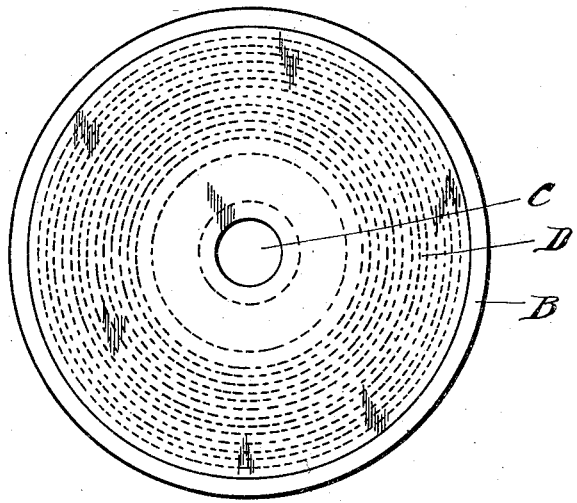
Figure 4:
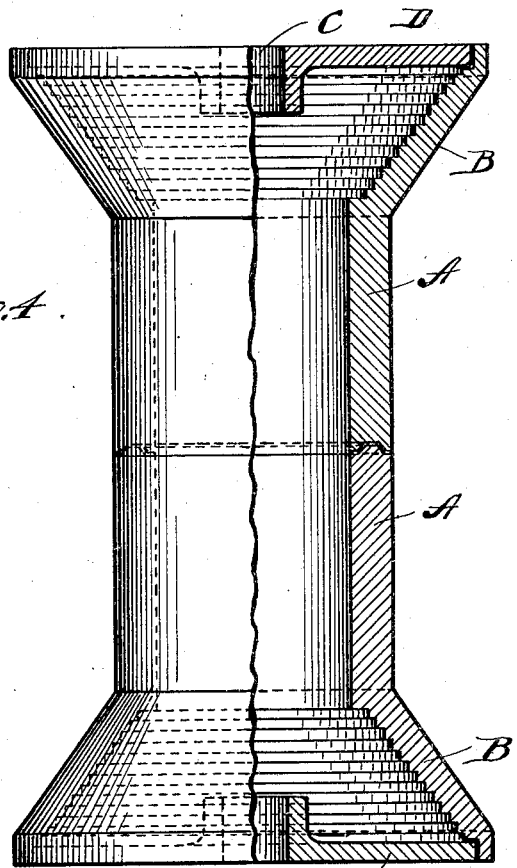

In the drawings, Figure 1 is a plan view of a hollow spool. Fig. 2 is a side elevation thereof, partly in section. Fig. 3 is a plan view of a hollow spool of slightly-modified form. Fig. 4 is a side elevation, partly in section, of the spool shown in Fig. 3.

In Figs. 1 and 2 I have shown a spool in which the body and heads are both cored out or hollow, so as to attain great economies in cost and weight. The body portion may comprise the sections A A, terminating in the flared portions B B, respectively. The flared portions may be formed integrally with said body portions A A, if desired. Inasmuch as such a spool would have no bearings to receive a spindle such as is commonly employed for supporting spools, I add suitable end or cap pieces D D, secured at the open end of each head portion B B, each cap-piece having a central bore C to afford a passage and bearing for the aforesaid supporting-spindle.

In Figs. 3 and 4 I have shown a spool of a construction which is of great advantage in forming spools from pulp, the inner wall of each head portion being stepped or serrated, I having found that a suitable die with a corresponding surface will more effectively compact the material of the spool while said head-section is being formed.

It will be seen that the entire body and the flared heads are hollow, and hence the spool as a whole is very light and yet, because of its novel construction, very strong and durable.

The preferable material for forming the spool is pulp containing a suitable amount of binding-size. This pulp is employed in a finely-divided state and compressed dry and heated while under compression until the size permeates the entire mass, blending it into one homogeneous body.

What I claim is—

1. A spool formed of compressed pulp and a binding-size, said spool being composed of two sections, each section including a portion of the body of the spool and one head, both the body and the head of each section being cored out to form a comparatively thin shell, said sections being joined together at the body portion, and cap-pieces arranged to be fitted to and secured in the outer end of each head-section.

2. A spool composed of a plurality of sections, said sections including the body portion and two heads, all of said sections being cored out or hollowed to form when assembled a comparatively thin shell, all of said sections being joined together at the body portion, and cap-pieces arranged to be fitted to and secured in the outer ends of each head-section.

GEORGE H. REYNOLDS.

Witnesses:
R. C. MITCHELL,
L. VREELAND.